US006772530B2

(12) United States Patent
Nennig

(10) Patent No.: US 6,772,530 B2
(45) Date of Patent: Aug. 10, 2004

(54) MATTRESS SIZING AND DISPLAY APPARATUS

(75) Inventor: Todd Nennig, Whitefish Bay, WI (US)

(73) Assignee: Dreamwell Ltd., Las Vegas, NV (US)

( * ) Notice: Subject to any disclaimer, the term of this patent is extended or adjusted under 35 U.S.C. 154(b) by 0 days.

(21) Appl. No.: 10/272,346

(22) Filed: Oct. 15, 2002

(65) Prior Publication Data

US 2004/0068882 A1 Apr. 15, 2004

(51) Int. Cl.[7] .............................. A47G 9/00; G01B 3/14
(52) U.S. Cl. ............................................. 33/562; 5/495
(58) Field of Search .......................... 33/562, 563, 566, 33/1 BB, 1 G, 1 B, 1 F; 5/482, 487, 495, 499, 658

(56) References Cited

U.S. PATENT DOCUMENTS

| | | | | | |
|---|---|---|---|---|---|
| 1,441,440 | A | * | 1/1923 | Mackness | 33/562 |
| 1,617,472 | A | * | 2/1927 | Wyse | 33/562 |
| 5,347,724 | A | * | 9/1994 | Hankins | 33/563 |
| 5,548,858 | A | * | 8/1996 | Shoa | 5/413 R |
| 5,655,236 | A | * | 8/1997 | Murray | 5/495 |
| 6,230,341 | B1 | * | 5/2001 | Dudley | 5/482 |

* cited by examiner

Primary Examiner—Christopher W. Fulton
(74) Attorney, Agent, or Firm—Ropes & Gray, LLP

(57) ABSTRACT

Presently disclosed is a mattress cover that has marked upon it outlines of the various sizes of mattresses available for sale for use a sizing gauge or selling aid. A conventional mattress cover may be printed or embroidered with lines representing the various sizes of all of the mattresses sold by that manufacturer. Thus, the manufacturer may outline on the cover the external dimensions of smaller mattresses. The lines representing the different mattress sizes may, in one embodiment, be printed on the fabric of the cover through conventional printing means prior to final assembly and quilting of the cover. In a further embodiment the lines may be embroidered or embossed either before or after assembly of the cover.

13 Claims, 1 Drawing Sheet

MATTRESS SIZING AND DISPLAY APPARATUS

BACKGROUND OF THE INVENTION

1. Field of the Invention

This invention relates to devices and apparatus for marketing and selling mattresses, specifically sales aids for selecting a mattress size.

2. Description of the Related Art

It is a common problem in the sale and marketing of mattresses that potential buyers are often unsure of what size mattress to purchase. Typically, buyers are shown mattresses of various sizes and lay down upon those mattresses to test them for both size and feel. This has a disadvantage of requiring extensive floor space for sample mattresses as well as investment in sample mattresses which cannot then be sold at full price to the public.

What is needed is a sales aid or sizing tool that can be used on a single mattress to display the varying sizes available and allow potential customers to test both the feel of the mattress and the size at the same time.

SUMMARY

Presently disclosed is a mattress cover that includes outlines of the various sizes of mattresses available for sale by a mattress manufacturer or retailer. Starting with the largest mattress size available, a conventional mattress cover fitting that size mattress may be conventionally printed or embroidered with lines representing the various sizes of all of the mattresses sold by that manufacturer. Thus, the manufacturer may outline (on the cover of its largest mattress) the external dimensions of the smaller mattresses, including but not limited to King, California King, Olympic Queen, Queen, Full, Twin, and Twin Extra Long sizes. The lines representing the different mattress sizes may, in one embodiment, be laser printed on the fabric of the cover through conventional printing means prior to final assembly and quilting of the cover. In an alternate embodiment, the lines and design forming the sizing guide may be printed on the cover by conventional inkjet, thermoprint, offset print, or lithographic methods. In a further embodiment, the lines may be embroidered on the mattress cover using conventional thread and embroidery techniques either before or after assembly of the cover.

BRIEF DESCRIPTION OF THE DRAWINGS

The present disclosure may be better understood and its numerous features and advantages made apparent to those skilled in the art by referencing the accompanying drawings.

DETAILED DESCRIPTION

Figure 1:
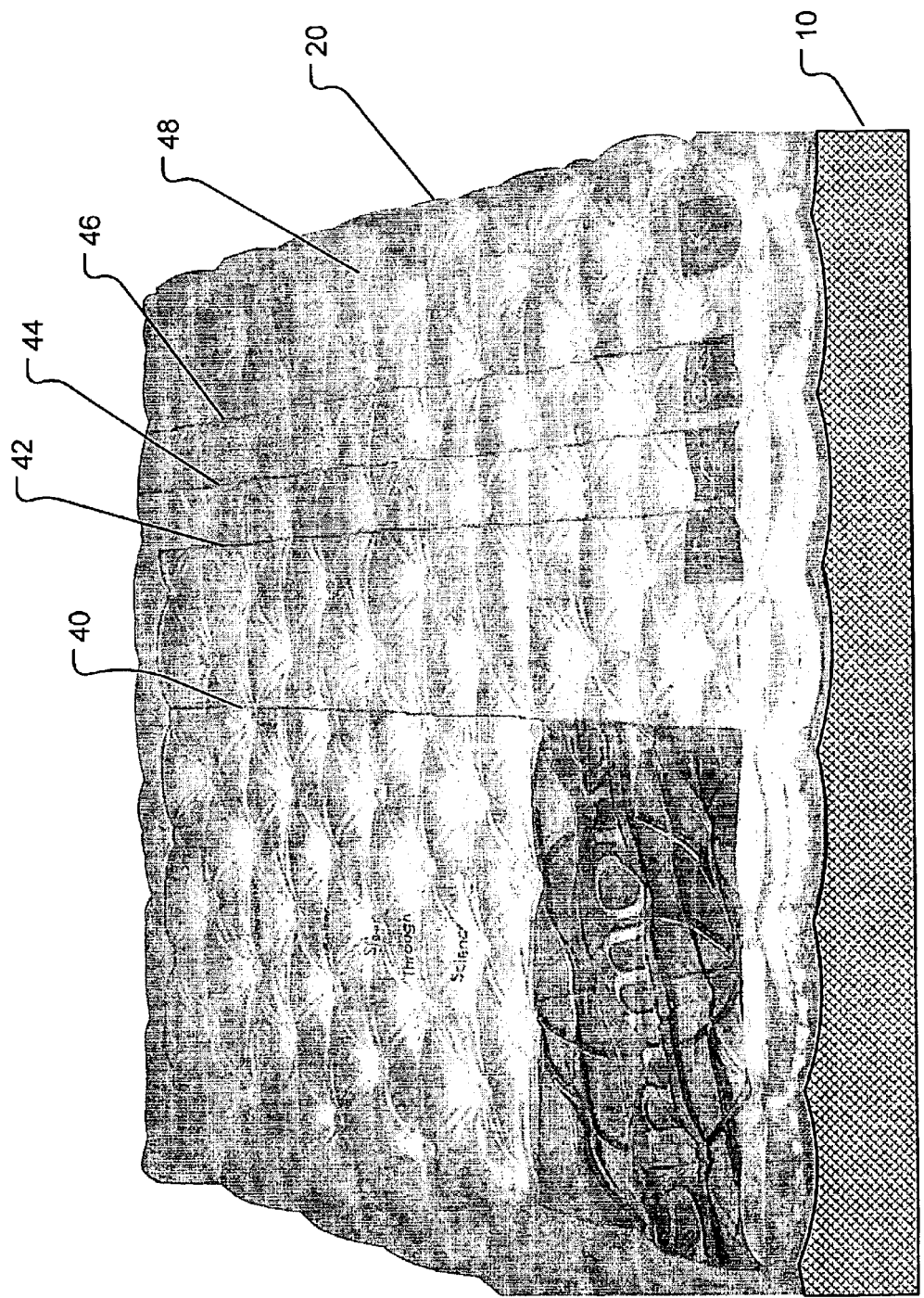
FIG. 1 is a partial isometric view of a mattress sizing apparatus according to one embodiment of the present invention The use of the same reference symbols in different drawings indicates similar or identical items.

FIG. 1 illustrates a mattress 10 having on it a mattress cover 20 including thereon lines delineating the various relative sizes of different mattresses. For example, line 40 displays the outline of a Twin bed. Line 42 shows the outline of a Full bed. Line 44 shows the outline of a Queen bed. Line 46 shows the outline of an Olympic Queen size bed. Line 48 displays the outline of a King bed.

In the example described above, bed 10 is a bed that is larger in size than a standard King bed. This is so that the outline of a King bed 48 can be printed on top of bed 10.

While FIG. 1 illustrates a mattress sized larger than a King sized bed, one of ordinary skill in the art will of course appreciate that the set of lines printed on cover 20 is determined by the size of mattress 10. Accordingly, the present invention is not limited to use on a mattress larger than King sized; in fact any size mattress can be used with the outlines of smaller sized mattresses printed thereupon.

Furthermore, the present invention is not limited to practice with mattress outlines 40 through 48 as described above. More or fewer mattress outlines, depending upon the range of mattress sizes that the manufacturer wishes to display, may be used.

Lines 40 through 48, in the exemplary embodiment, may be printed on cover 20 as with any conventional printing means, such as but not limited to laser or offset printing, lithograph, inkjet, or other printing means now known or to be discovered in the future. In an alternate embodiment, lines 40 through 48 (as in the exemplary embodiment of FIG. 1) may be embroidered on cover 20, using conventional embroidery means. In a still further embodiment, lines may be embossed onto cover 20 by conventional embossing means.

Although printing or embroidery of lines on a mattress cover is shown in the exemplary embodiment, one of ordinary skill in the art will realize that such marking can be made on other top surface elements of mattresses known in the art today. For example, the marking may be effected on a topper or on a sheet or mattress pad placed on a conventional mattress. The terms "topper" and mattress "pad" are generally used and understood in the bedding arts and need no further discussion. In further alternative embodiment, mattress sizing lines may be printed or embroidered on a slip cover or pullover cover that can be used to protect the demonstrator mattress on the showroom floor.

While particular embodiments of the present invention have been shown and described, it will be apparent to those skilled in the art that changes and modifications may be made without departing from this invention in its broader aspect and, therefore, the appended claims are to encompass within their scope all such changes and modifications as fall within the true spirit of this invention.

I claim:

1. A measuring apparatus for a mattress, comprising
   a mattress core having a major surface defining a sleeping surface; and
   a cover covering the sleeping surface of said mattress core;
   wherein said cover comprises one or more gauge lines disposed on an outer surface of said cover and delineating one or more surface areas on the sleeping surface that are smaller than the major surface of the mattress core, to aid a user in selecting a mattress.

2. The apparatus of claim 1, wherein said gauge lines are printed on said cover.

3. The apparatus of claim 1, wherein said gauge lines are laser printed on said cover.

4. The apparatus of claim 1, wherein said gauge lines are embroidered on said cover.

5. The apparatus of claim 1, wherein said cover is quilted and wherein said gauge lines are embossed on said quilted cover.

6. An apparatus for gauging mattress size, comprising:
   a mattress core having a major surface defining a sleeping surface;

a cover covering the sleeping surface of said mattress core; and means for marking an outer surface of said cover with one or more gauge lines delineating one or more surface areas of the mattress that are smaller than the major surface of the mattress core, to aid a user in selecting a mattress.

7. The apparatus of claim 6, wherein said means for marking comprise printing means.

8. The apparatus of claim 6, wherein said means for marking comprise laser printing means.

9. The apparatus of claim 6, wherein said means for marking comprise embroidery means.

10. The apparatus of claim 6, wherein said cover is quilted and wherein said means for marking comprise embossing means.

11. Method for aiding a user in selecting a desired mattress size, comprising:

providing a mattress having a sleeping area; and delineating on said sleeping area additional sleeping areas having a smaller size than the sleeping area, wherein the user selects the desired mattress size from a mattress having a size of the sleeping area or a size of one of the additional sleeping areas.

12. The method of claim 11, wherein delineating includes placing a cover on the mattress and applying to the cover gauge lines located within the sleeping area.

13. The method of claim 12, wherein the gauge lines are applied by at least one of printing, laser printing, embroidering and embossing.

* * * * *